Jan. 28, 1964 E. J. GANTZ 3,119,372
BIRD CAGE FEEDER DEVICE
Filed Nov. 23, 1962 2 Sheets-Sheet 1
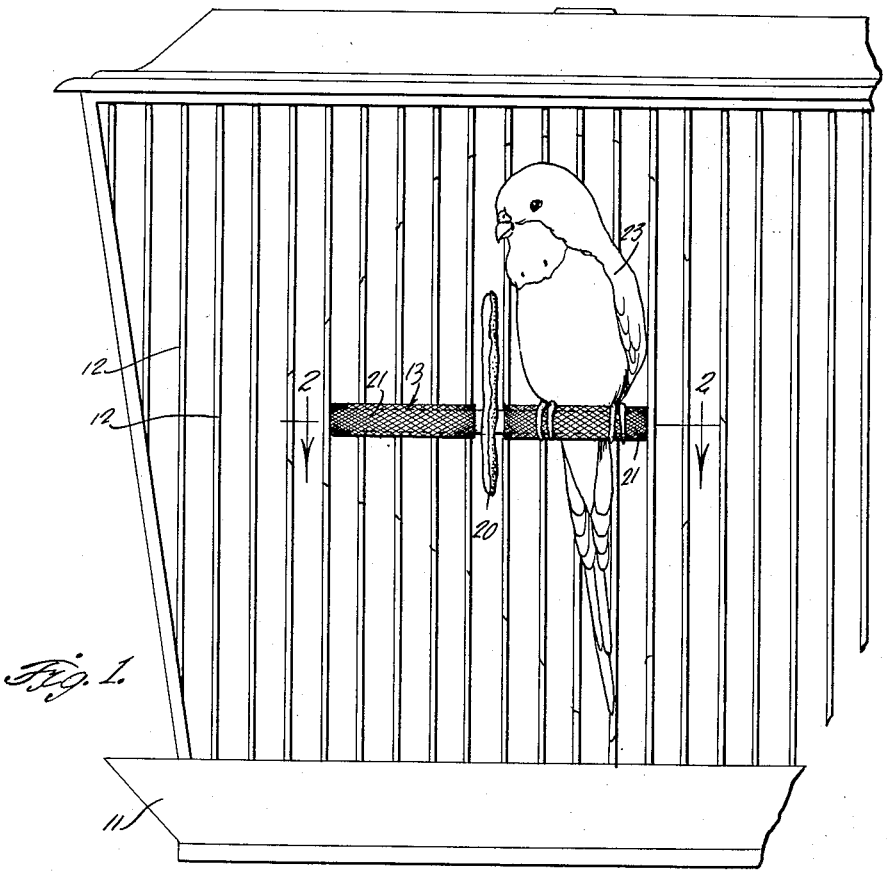
Fig. 1.
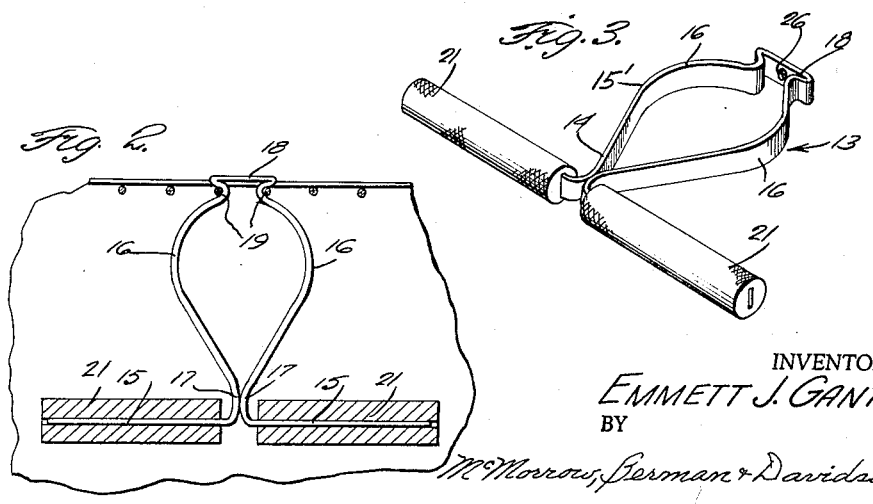
Fig. 2.
Fig. 3.
INVENTOR.
EMMETT J. GANTZ
BY
McMorrow, Berman & Davidson
ATTORNEYS Jan. 28, 1964  E. J. GANTZ  3,119,372
BIRD CAGE FEEDER DEVICE
Filed Nov. 23, 1962  2 Sheets-Sheet 2
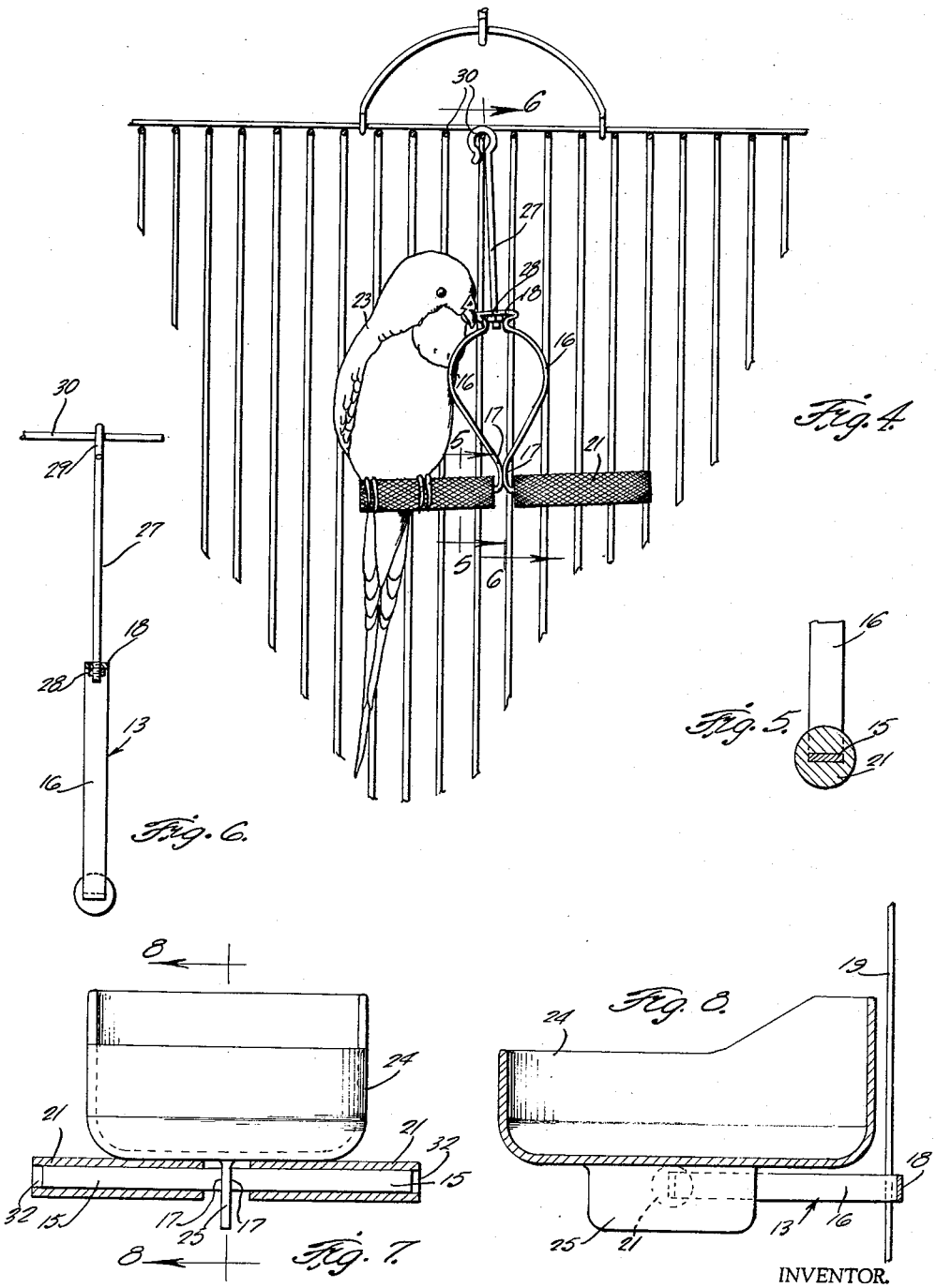
INVENTOR.
EMMETT J. GANTZ
BY
McMorrow, Berman & Davidson
ATTORNEYS

United States Patent Office 3,119,372
Patented Jan. 28, 1964

3,119,372
BIRD CAGE FEEDER DEVICE
Emmett J. Gantz, 1007 S. 14th St., Burlington, Iowa
Filed Nov. 23, 1962, Ser. No. 239,723
3 Claims. (Cl. 119—18)

This invention relates to bird feeding devices, and more particularly to a combination feeder device and perch for use in a bird cage.

A main object of the invention is to provide a novel and improved combined perch and feeder device for use in a bird cage, the device being relatively simple in construction, being very easy to install, and providing a means for conveniently and securely supporting a bird bath, a feed cup, or a food article in a bird cage within convenient reach of a bird therein.

A further object of the invention is to provide an improved combined perch and feeder device for use in a bird cage, said device being very inexpensive to manufacture, being durable in construction, and being suitable for use either in a horizontal position wherein it is supported by a pair of adjacent bars of a bird cage or in a vertical position wherein it is suspended from a portion of the top of the cage.

A still further object of the invention is to provide an improved combined perch and food-supporting device for a bird cage, said device providing a firm and secure surface on which a bird may perch and also providing a means for supporting a water container, a feed cup, or a food article within convenient reach of the bird, the device being inconspicuous in appearance, being relatively compact in size, and involving very few parts.

Further objects and advantages of the invention will become apparent from the following description and claims, and from the accompanying drawings, wherein:

FIGURE 1 is a fragmentary side elevational view of a bird cage provided with an improved combined perch and feeder device constructed in accordance with the present invention, portions of the bars of the front wall of the cage being broken away to illustrate the feeder device.

FIGURE 2 is an enlarged horizontal cross sectional view taken substantially on the line 2—2 of FIGURE 1.

FIGURE 3 is a perspective view of the combined perch and feeder device shown in FIGURES 1 and 2, shown detached from the bird cage.

FIGURE 4 is a fragmentary elevational view, similar to FIGURE 1, but showing the feeder device employed in a vertical position.

FIGURE 5 is an enlarged vertical cross sectional view taken substantially on the line 5—5 of FIGURE 4.

FIGURE 6 is a vertical cross sectional view taken substantially on the line 6—6 of FIGURE 4.

FIGURE 7 is an enlarged vertical cross sectional view taken longitudinally through the perch portion of the feeder device, with the device in a horizontal position, illustrating the manner in which the device is employed to support a bird bath.

FIGURE 8 is a vertical cross sectional view taken substantially on the line 8—8 of FIGURE 7.

Referring to the drawings, and more particularly to FIGURES 1 to 3, 11 designates a conventional bird cage having the respective walls provided with the vertically arranged, uniformly spaced bar elements 12. Designated generally at 13 is a combined perch and feeder attachment according to the present invention.

The attachment 13 comprises a strip of spring material, for example, resilient metal, designated at 14, formed to define a pair of aligned straight arms 15, 15 and a central loop 15' projecting outwardly from between said arms, said loop having arcuately curved, generally outwardly convex sides 16, 16 normally abutting each other at the respective bends 17, 17. The arms 16, 16 are integrally connected by a straight bight portion 18 which extends parallel to the arms 15, 15, the side arms 16, 16 having localized outwardly concave portions 19, 19 located adjacent the straight bight portion 18, the bight portions 19, 19 being spaced so that they will lockingly interengage with a pair of adjacent vertical bars 12, 12 of a bird cage, the locking engagement of the bars 12, 12 with the curved portions 19, 19 being sufficiently tight to support the device in a horizontal position, as illustrated in FIGURE 1.

As shown in FIGURE 2, the curved portions 17, 17 at the forward ends of the side members 16, 16 normally abut each other and are urged into abutting relationship by the resiliency of the side members 16, 16, the portions 17, 17 being separable against the spring tension of the loop and being adapted to clampingly engage and support an article placed therebetween, for example, a cracker 20, as shown in FIGURE 1, or any other article.

Secured on the aligned members 15, 15 are respective cylindrical perch sleeves 21, 21, said sleeves being formed with knurled outer surfaces, and being made of any suitable material, for example, of molded plastic material. The knurled outer surfaces of the sleeves 21, 21 insure a firm grip for a bird using the device, for example, the bird 23 in FIGURE 1, aid in removing scale off the bottom of the bird's feet, and also assist in stimulating the circulation of the bird's feet.

As shown in FIGURES 7 and 8, the attachment, when mounted in the horizontal position thereof illustrated in FIGURES 1, 2 and 3, may also be employed to support a bird bath 24, the bird bath being of a type provided with a longitudinal depending rib 25 which is receivable between the front bends 17, 17, thus clamping the bird bath firmly to the attachment. The straight bight portion 18 is formed with a central aperture 26 which may be used in conjunction with a hooked supporting rod 27 to support the device in a vertical position, for example, as illustrated in FIGURES 4, 5 and 6, the rod 27 engaging through the aperture 26 and being retained by a nut 28 threaded on the end of the rod and received beneath the bight portion 18, as shown in FIGURE 6. The rod 27 has a hook 29 at its top end which is engageable over any convenient portion of the roof of the cage, for example, over a horizontally extending bar element 30 in the cage roof. The device 13 may thus be supported in a vertical position, and may be employed to support a cracker or other food article between the opposing bends 17, 17, in the same manner as when the device is mounted horizontally.

The perch sleeves 21, 21 are formed of any suitable rigid material, for example, plastic material, as mentioned above, and are provided with central bores of rectangular cross section, shown at 32, in which the aligned members 15, 15 are respectively secured, for example, by tight frictional engagement therewith.

Obviously, the central aperture 26 in the bight portion 18 may be internally threaded to receive the threaded end of the rod 27, which will eliminate the necessity for using the retaining nut 28.

While certain specific embodiment of an improved feeding attachment for bird cages have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A feeding attachment for bird cages comprising a strip of spring material formed to define a pair of aligned perch arms and a central loop projecting outwardly from between said arms, said loop having resilient arcuately curved generally outwardly convex sides having opposed food gripping end portions normally abutting each other adjacent said aligned arms and a bight portion integrally connecting the outer portions of said sides, said sides having localized outwardly concave portions adjacent said bight portion adapted to at times receive and lockingly interengage with a pair of adjacent vertical bars of a bird cage to support said attachment in a horizontal position.

2. A feeding attachment for bird cages comprising a strip of spring material formed to define a pair of aligned arms and a central loop projecting outwardly from between said arms, said loop having resilient arcuately curved generally outwardly convex sides having opposed food gripping end portions normally abutting each other adjacent said aligned arms and a bight portion integrally connecting the outer portions of said sides, said sides having localized outwardly concave portions adjacent said bight portion adapted to at times receive and lockingly interengage with a pair of adjacent vertical bars of a bird cage to support said attachment in a horizontal position, and respective perch sleeves engaged on and surrounding said aligned arms and extending adjacent said food gripping end portions.

3. A feeding attachment for bird cages comprising a strip of spring material formed to define a pair of aligned arms and a central loop projecting outwardly from between said arms, said loop having resilient arcuately curved generally outwardly convex sides having food gripping end portions normally abutting each other adjacent said aligned arms and a bight portion integrally connecting the outer portions of said sides, said bight portion extending parallel to said aligned arms and being formed with a central aperture adapted to receive the end of a suspension rod, said sides having localized outwardly concave portions adjacent said bight portion adapted to at times receive and lockingly interengage with a pair of adjacent vertical bars of a bird cage to support said attachment in a horizontal position, and respective perch sleeves engaged on and surrounding said aligned arms and extending adjacent said food gripping end portions, said perch sleeves being generally circular in cross section and having knurled exterior surfaces.

References Cited in the file of this patent

UNITED STATES PATENTS

| | | |
|---|---|---|
| 1,092,314 | White | Apr. 7, 1914 |
| 1,886,015 | Henning et al. | Nov. 1, 1932 |
| 1,961,171 | Sanford | June 5, 1934 |